United States Patent
Gower et al.

(10) Patent No.: US 11,067,035 B2
(45) Date of Patent: Jul. 20, 2021

(54) GAS TURBINE EXHAUST COOLING SYSTEM

(71) Applicant: ROLLS-ROYCE plc, London (GB)

(72) Inventors: Edward C Gower, Bristol (GB); Paul R Davies, Bristol (GB)

(73) Assignee: ROLLS-ROYCE plc, London (GB)

( * ) Notice: Subject to any disclaimer, the term of this patent is extended or adjusted under 35 U.S.C. 154(b) by 457 days.

(21) Appl. No.: 16/162,860

(22) Filed: Oct. 17, 2018

(65) Prior Publication Data
US 2019/0128215 A1    May 2, 2019

(30) Foreign Application Priority Data

Oct. 30, 2017 (GB) ...................................... 1717768

(51) Int. Cl.
| | |
|---|---|
| *F02K 1/82* | (2006.01) |
| *F02C 7/18* | (2006.01) |
| *B64D 33/04* | (2006.01) |
| *B64D 33/08* | (2006.01) |
| *F02K 1/38* | (2006.01) |

(52) U.S. Cl.
CPC ............. *F02K 1/825* (2013.01); *B64D 33/04* (2013.01); *B64D 33/08* (2013.01); *F02C 7/18* (2013.01); *F02K 1/386* (2013.01); *F02K 1/822* (2013.01); *F05D 2260/202* (2013.01)

(58) Field of Classification Search
CPC ................................................ B64D 2033/045
See application file for complete search history.

(56) References Cited

U.S. PATENT DOCUMENTS

| | | |
|---|---|---|
| 2,974,486 A | 3/1961 | Edwards |
| 3,970,252 A | 7/1976 | Smale et al. |
| (Continued) | | |

FOREIGN PATENT DOCUMENTS

| | | |
|---|---|---|
| EP | 1674708 A2 | 6/2006 |
| EP | 3260694 A1 | 12/2017 |
| (Continued) | | |

OTHER PUBLICATIONS

Mar. 14, 2019 European Search Report issued in European Patent Applciation No. 18 20 1012.

(Continued)

*Primary Examiner* — Scott J Walthour
*Assistant Examiner* — David P. Olynick
(74) *Attorney, Agent, or Firm* — Oliff PLC (57) ABSTRACT

A gas turbine engine includes a main gas flow exhaust nozzle having an annular inner surface which, in use, bounds a flow of exhaust gas. The gas turbine engine further includes cooling passages having respective outlets therefrom to provide a flow of cooling air over a surface of the engine or an adjacent airframe component, thereby protecting the cooled surface from the exhaust gas flow. Adjacent cooling passages of the or each pair of the nested cooling passages are separated from each other by a respective dividing wall. The outlets from the nested cooling passages are staggered in the axial direction of the exhaust nozzle such that cooling air flowing out of an inner one of the adjacent cooling passages of the or each pair of the nested cooling passages flows over the dividing wall separating the adjacent passages.

14 Claims, 5 Drawing Sheets

(56) References Cited

U.S. PATENT DOCUMENTS

| | | | | |
|---|---|---|---|---|
| 4,002,024 A | * | 1/1977 | Nye | B64D 33/04 |
| | | | | 60/262 |
| 4,072,008 A | * | 2/1978 | Kenworthy | F02K 3/075 |
| | | | | 60/262 |
| 4,372,110 A | | 2/1983 | Fletcher et al. | |
| 5,435,127 A | * | 7/1995 | Luffy | F02K 1/1223 |
| | | | | 60/204 |
| 5,746,047 A | | 5/1998 | Steyer et al. | |
| 6,164,059 A | * | 12/2000 | Liang | F02K 1/008 |
| | | | | 239/127.3 |
| 2009/0178383 A1 | | 7/2009 | Murphy et al. | |

FOREIGN PATENT DOCUMENTS

| | | |
|---|---|---|
| FR | 2 216 450 A1 | 8/1974 |
| GB | 1284743 A | 8/1972 |

OTHER PUBLICATIONS

Apr. 27, 2018 Great Britain Search Report issued in Patent Application No. 1717768.4.

\* cited by examiner

GAS TURBINE EXHAUST COOLING SYSTEM

FIELD OF THE PRESENT DISCLOSURE

The present disclosure relates to a gas turbine engine comprising an exhaust cooling system.

BACKGROUND

Components of aircraft gas turbines engines such as turbojets and turbofans typically reach high temperatures, and so may require cooling in order to prevent damage to components. In particular, gas turbine engines having afterburners (also known as "reheat") may require cooling of the exhaust nozzle, to prevent damage to the nozzle itself.

The hot exhaust gasses are problematic because they induce thermal strain in the nearby components, causing them to be subjected to thermal degradation throughout the mission cycle. The thermal load can be so aggressive that it can force design compromises in material choice and/or component lifting, leading to additional cost or maintenance burden.

One known gas turbine exhaust nozzle comprises a cooling channel which surrounds the gas turbine engine core in an annular arrangement (known as a "skirted ring"). Cooling air is provided from a compressor or bypass duct to the channel, which is then exhausted on to a downstream internal cooled surface of the core exhaust nozzle. The cooling air provides a cooling film, which shields the cooled surface from hot exhaust gasses. However, turbulence induced by shear from the relatively slow moving cooling air and the relatively fast (generally supersonic) core exhaust flow causes mixing between the flows, thereby reducing the effectiveness of the cooling. Even where the cooling airflow is provided at high velocity, a relatively slow moving boundary layer is formed adjacent the cooled surface. This slow moving boundary air again interacts with the fast moving core exhaust flow, thereby again causing mixing.

Figure 1A:
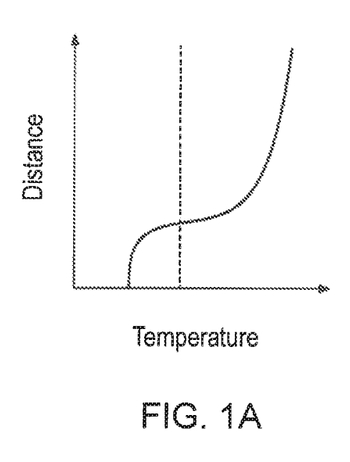
FIG. 1A shows schematically a plot of distance in the thickness direction of a boundary layer against temperature for a newly-formed boundary layer on a cooled surface.
Figure 1B:
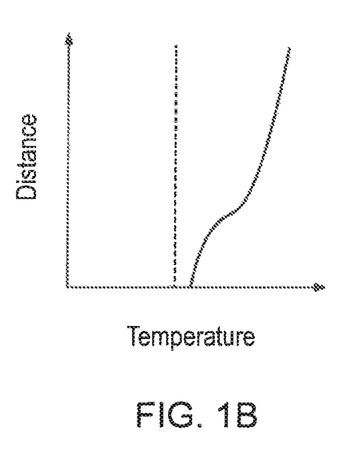
FIG. 1B shows schematically a plot of distance in the thickness direction of the boundary layer against temperature for the boundary layer after mixing with fast moving core exhaust flow.

This fluidic mixing leads to a degradation of thermal gradient through the thickness of the boundary layer, and hence a reduction in cooling effectiveness along the length of the cooled surface. The decline in cooling effectiveness in turn produces a thermal gradient along the length of the surface, with the hottest position being at the downstream-most end (i.e. the trailing edge) of the surface. To illustrate this FIG. 1A shows schematically a plot of distance in the thickness direction of a boundary layer against temperature for a newly-formed boundary layer on a cooled surface, and FIG. 1B shows a corresponding plot for the boundary layer after mixing with fast moving core exhaust flow (i.e. at a position downstream from that of the first plot). The dashed line on both plots may represent a material temperature limit, and shows how excessive mixing can cause material damage, which in turn may impose an extra maintenance burden. Alternatively, the dashed line can represent an operational temperature limit, showing how excessive mixing can necessitate restrictions on engine operations and/or lead to unacceptably high infra-red emissions.

Increasing the radial thickness of the outlet from the cooling channel can increase the mass flow of the cooling film. However, because the cooling flow is drawn from the compressor or bypass duct, and would otherwise be used to generate thrust, increasing the mass flow of the cooling film reduces the overall propulsive efficiency of the engine.

A second known nozzle comprises a cooling channel contained within the nozzle itself. Small holes are provided which extend into the gas turbine engine core flow. Cooling air thereby leaks out in the main core flow, thereby providing effusion cooling. However, such a system results in a high pressure loss in view of the resistance to flow provided by the relatively small cooling holes. The cooling holes are expensive to manufacture, and are prone to blockages. Furthermore, since the cooling flow enters the main core flow generally normal to the core flow direction, the cooling flow does not contribute to aircraft thrust.

SUMMARY

Consequently, there is a need for an improved aircraft gas turbine engine exhaust nozzle cooling arrangement which addresses one or more of the above problems.

Accordingly, the present disclosure provides a gas turbine engine including:
 a main gas flow exhaust nozzle having an annular inner surface which, in use, bounds a flow of exhaust gas; and
 nested cooling passages having respective outlets therefrom to provide a flow of cooling air over a surface of the engine or an adjacent airframe component, thereby protecting the cooled surface from the exhaust gas flow;
 wherein adjacent cooling passages of the or each pair of the nested cooling passages are separated from each other by a respective dividing wall, and the outlets from the nested cooling passages are staggered in the axial direction of the exhaust nozzle such that cooling air flowing out of an inner one of the adjacent cooling passages of the or each pair of the nested cooling passages flows over the dividing wall separating the adjacent passages.

Advantageously, by axially staggering the outlets from the cooling passages, the relatively slow moving boundary layer formed adjacent the cooled surface can be sustained over a greater axial distance. In particular, the cooling layer can be introduced gradually along the length of the cooled surface. This effectively delays the mixing of the flow through the boundary layer. Moreover, by arranging the axial staggering such that the cooling air flowing out of one cooling passage flows over the dividing wall separating that passage from its adjacent passage, the dividing walls themselves can be cooled, and thus protected from the exhaust gas flow. The cooling passages may be considered as dividing a conventional outlet into a series of smaller outlets that are staggered in the axial direction.

The engine may have any one or, to the extent that they are compatible, any combination of the following optional features.

Conveniently, the cooling passages can be configured to provide a flow of cooling air generally parallel to the exhaust gas flow. This helps to reduce mixing between the cooling air and the exhaust gas flow.

In principle any number of the cooling passages can be nested. However, typically, the engine may have two, three, four, five, six, seven or eight nested passages, or a range of any of these values.

The passage height (i.e. the spacing between walls in the radial direction of the passages through which cooling air flows) may be between 5 and 40 mm; or between 5 and 30 mm; or between 10 and 20 mm; or a range of any combination of the aforesaid endpoints. Each of the passages may have the same spacing or they may each have a different spacing.

Adjacent outlets of the nested cooling passages may be staggered in the axial direction by a distance that is between 2 and 15 times the passage height; or between 3 and 13 times the passage height; or between 5 and 10 times the passage height or a range of any combination of the aforesaid endpoints. So for example, if four passages each have a height of 10 mm, the outlet of each passage will be spaced in the axial direction a distance between 50 and 100 mm. Therefore, the first outlet will be separated from the fourth outlet by an axial distance between 150 mm and 300 mm. The second-most radially inner dividing wall may be between 150 mm and 300 mm longer than the most radially inner dividing wall; likewise, the third-most radially inner dividing wall may be between 150 mm and 300 mm longer than the second-most radially inner dividing wall.

Thus, the lengths of the dividing walls may increase sequentially from the radially innermost to the radially outermost by between 2 and 15 times the passage height; or between 3 and 13 times the passage height; or between 5 and 10 times the passage height.

In embodiments, the first outlet may be spaced from the last outlet by an axial distance of from 0.15 m to 2 m; or between 0.25 m to 1.2 m or between 0.4 to 0.7 m, or a range of any combination of the aforesaid endpoints.

The cooling passages may be radially nested relative to the axial direction of the exhaust nozzle, e.g. so that there is a radially innermost passage and one or more further passages located radially outwards therefrom at successively increasing radial distances.

The nested cooling passages may be arranged such that all of the passages overlap each other in at least one axial position. The nested cooling passages may be arranged such that all of the passages begin at substantially the same axial position.

On a longitudinal cross-section through the exhaust nozzle, the outlets from the cooling passages may lie on a straight line which is parallel to the axial direction of the exhaust nozzle. Such an arrangement can help to reduce the frontal area of the cooling passages, e.g. so that they occupy less radial space in the exhaust nozzle.

The cooled surface can include surfaces of engine or airframe components (such as wings and nacelles) which are downstream of the exhaust nozzle. The outlets from the nested cooling passages may conveniently be formed in the annular inner surface of the exhaust nozzle. In particular, the outlets may be formed in the annular inner surface upstream of a trailing edge of the exhaust nozzle. In this way the cooled surface can include at least a first portion of the annular inner surface.

When the outlets from the nested cooling passages are formed in the annular inner surface, the cooling passages may be annular and coaxial with each other. In this way a boundary layer can be formed round a full circumference of the first portion of the inner surface of the exhaust nozzle. However, this does not exclude that the cooling passages can be non-axisymmetric, e.g. to provide cooling at specific angular locations around the inner surface.

In particular, non-axisymmetric cooling passages can be used to direct flow of cooling air to airframe surfaces such as those of a wing and/or nacelle.

The gas turbine engine may further include a cooling channel which supplies the flow of cooling air to the cooling passages, the cooling channel axially extending radially outwardly of a second portion of the annular inner surface of the exhaust nozzle. The second portion of the inner surface is typically upstream of the first portion. The cooling channel may be annular. In this way the channel can cool a full circumference of the second portion of the inner surface. However, this does not exclude that the channel can be non-axisymmetric, e.g. to provide cooling at specific angular locations around the inner surface, and/or because the cooling passages are non-axisymmetric.

The above-mentioned cooling channel may contain an aerodynamic throat to choke the flow of cooling air therethrough. This can help to decouple the cooling performance of the channel and the nested passages from the performance of the engine.

Additionally or alternatively, the above-mentioned cooling channel may have a controllable flow metering device to variably meter the flow of cooling air therethrough. For example, the metering device can be opened at engine operating conditions (such as take-off in hot conditions) when cooling requirements are high, and closed at engine operating conditions (such as cruise) when cooling requirements are low. As another example, the metering device can be opened when control of infra-red signature is required.

A part of the exhaust nozzle may have a variable area. In particular, the above-mentioned first portion of the annular inner surface of the exhaust nozzle may include the inner surface of the variable area part.

BRIEF DESCRIPTION OF THE DRAWINGS

Embodiments of the present disclosure will now be described by way of example with reference to the accompanying drawings in which.

DETAILED DESCRIPTION AND FURTHER OPTIONAL FEATURES

Figure 2:
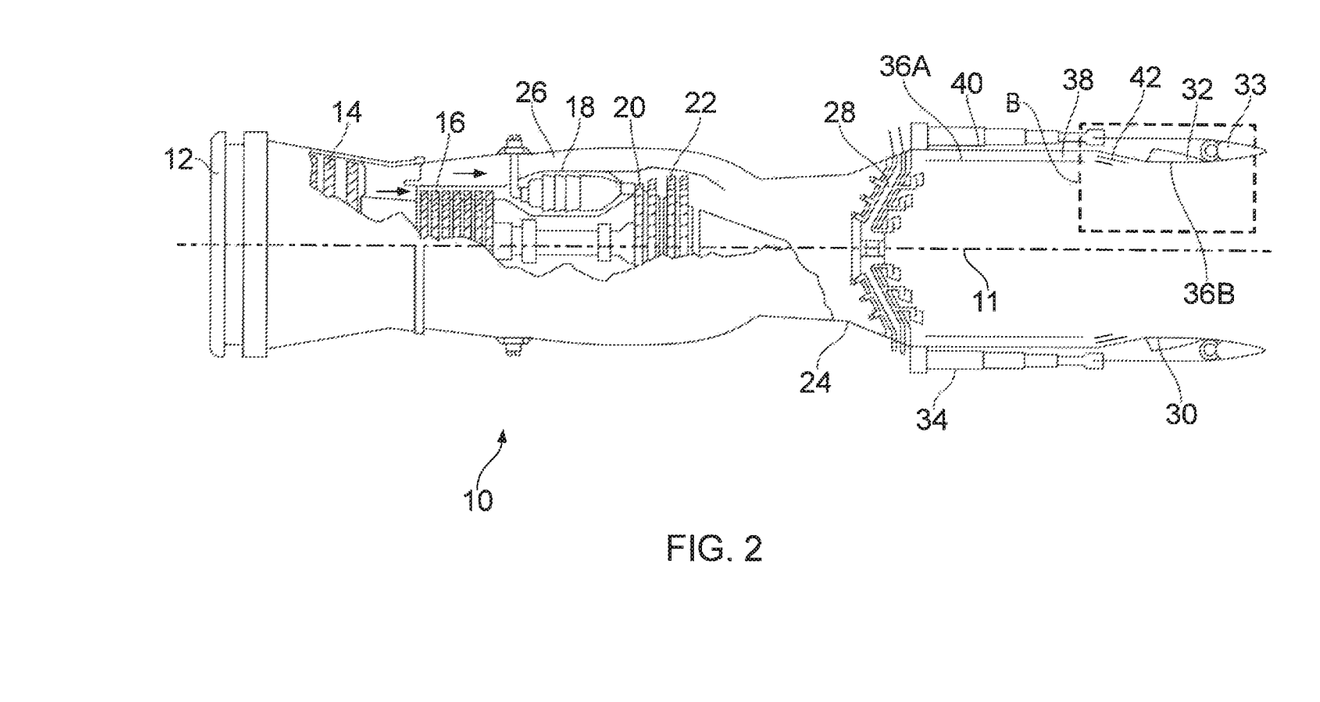
FIG. 2 shows a longitudinal partial cut-away cross-section through a gas turbine engine.

With reference to FIG. 2, a gas turbine engine is generally indicated at 10, having a principal and rotational axis 11. The engine 10 comprises, in axial flow series, an air intake 12, a low-pressure compressor 14, a high-pressure compressor 16, combustion equipment 18, a high-pressure turbine 20, a low-pressure turbine 22 and a mixing duct 24. A casing generally surrounds the engine 10 and defines both the intake 12 and the mixing duct 24.

The gas turbine engine 10 works in the conventional manner so that air entering the intake 12 is compressed by the low-pressure compressor 14 to produce two air flows: a first air flow (shown by a dotted arrow in FIG. 2) into the high-pressure compressor 16, and a second air flow (shown by a solid arrow in FIG. 2) which passes through a bypass duct 26. The high-pressure compressor 16 further compresses the second air flow directed into it before delivering that air to the combustion equipment 18 where it is mixed with fuel and the mixture combusted. The resultant hot combustion products then expand through, and thereby drive the high and low-pressure turbines 20, 22 before being exhausted through the mixing duct 24, where it is mixed with first air flow from the bypass duct 26. The high and low pressure turbines 20, 22 drive respectively the compressor 16 and low-pressure compressor 14, each by a suitable interconnecting shaft (not shown).

Downstream of the mixing duct 24 is further combustion equipment in the form of an afterburner 28 (also known as a "reheat") which comprises fuel injectors. The fuel injectors add additional fuel to the mixed exhaust stream downstream of the mixing duct 24, to further raise the temperature and pressure of the exhaust, when operated.

Downstream of the afterburner 28 is a main gas flow exhaust nozzle 30. The exhaust nozzle 30 is generally annular, and contains gasses as they combust, and accelerates those gasses to provide thrust. In order to efficiently provide thrust and manage backpressure at various operating conditions (such as engine mass flow and external atmospheric pressure), a downstream end of the nozzle 30 comprises a variable geometry part in the form of pivotable vanes 32, 33 which control the outlet area of the nozzle 30 by pivoting inwardly and outwardly. The position of the vanes 32, 33 is controlled by actuators 34 in the form of hydraulic rams. The vanes 32, 33 may pivot relative to one another, in addition to pivoting relative to the remainder of the engine.

The nozzle 30 comprises an annular inner surface, which extends parallel to the longitudinal axis 11, and is in contact with the hot main gas flow of the engine. Consequently, the inner surface requires cooling to prevent damage to the nozzle. The surface has an upstream portion 36A and a downstream portion 36B, and cooling for both portions is provided by an annular cooling channel 38 which runs parallel to the longitudinal axis 11, and so parallel to the direction of the main gas flow, between the upstream portion 36A and an outer casing 40 of the nozzle. The channel carries cooling air sourced from one or more of the compressors 14, 16, or from atmospheric air, and thus the cooling air carried by the channel has a lower velocity than the main gas flow (i.e. air flowing through the exhaust nozzle 30 bounded by its inner surface) when the afterburner is in operation.

The cooling air carried by the channel convectively cools the upstream portion 36A of the inner surface. Plural nested cooling passages 42 are provided at a downstream end of the cooling channel 38, downstream of the afterburner 28 but upstream in the main gas flow path of the trailing edge of the main gas flow exhaust nozzle 30. The nested array 42 directs the cooling air out of the cooling channel 38 in a generally longitudinal direction, parallel to the main gas flow, and over the downstream portion 36B of the inner surface to form a shielding boundary layer. The nested array 42 divides the outlet of the cooling channel 38 into a series of smaller axially staggered outlets. Air exhausted from the cooling channel 38 flows, in particular, over the pivotable vanes 32.

Figure 3:
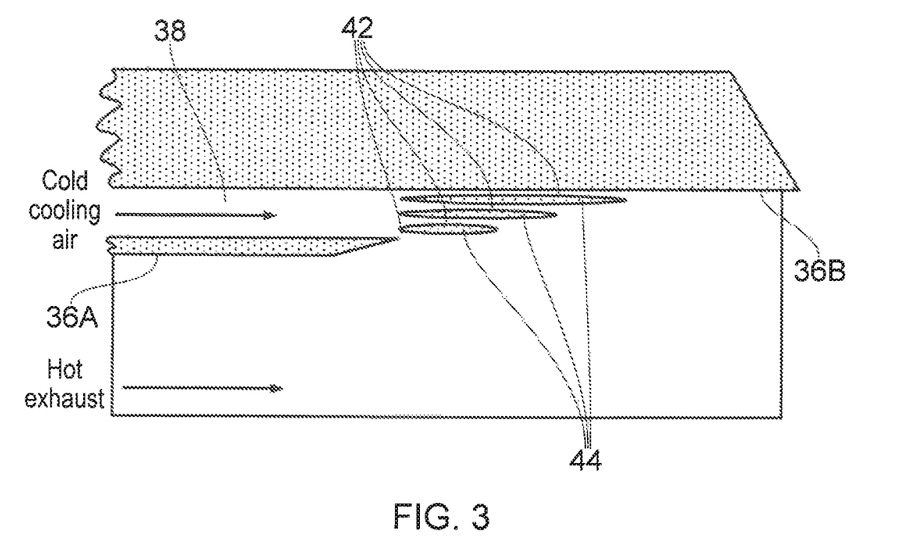
FIG. 3 shows the area of box B of FIG. 2 in more detail.

FIG. 3 shows the area of box B of FIG. 2 in more detail. The cooling passages 42 at the downstream end of the cooling channel 38 are separated from each other by dividing walls 44. Conveniently, these passages can be radially nested to provide a radially innermost passage and one or more (e.g. three as drawn in FIG. 3) further passages located radially outwards therefrom at successively increasing radial distances. The outlets from the passages are axially staggered such that the cooling air flowing out of a radially inner passage flows over the dividing wall separating that passage from its adjacent radially outer passage. In this way, the cooling film can be introduced gradually along the length of the downstream portion 36B of the inner surface. This effectively delays the mixing of the flow through its boundary layer, allowing the surface to be adequately cooled before mixing can occur. The radially outermost cooling passage directs the coldest cooling flow to the aft-most point of the downstream portion 36B of the inner surface, the second-from-outermost cooling passage then helps to cool the dividing wall between it and the radially outermost cooling passage, whilst the third-from-outermost cooling passage helps to cool the dividing wall between it and the second-from-outermost cooling passage, and so on.

Figure 4:
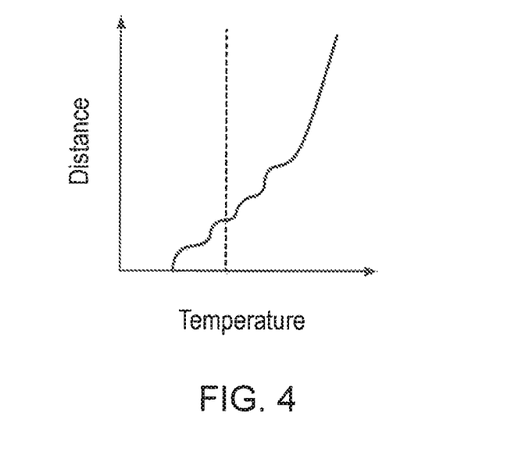
FIG. 4 shows schematically a plot of distance in the thickness direction of a boundary layer against temperature for a boundary layer formed by axially staggered outlets of cooling passages of an exhaust nozzle of the engine of FIGS. 2 and 3.

Any number of cooling passages 42 can be built up, depending on the length of the surface to be cooled and the thermal gradient required. FIG. 4 shows schematically a plot of distance in the thickness direction of a boundary layer against temperature for a boundary layer formed by the axially staggered outlets of the cooling passages 42 in the ideal case where there is little turbulence, mixing, and heat transfer through the layers. The plot demonstrates a "staircase" of thermal gradient through the boundary layer, allowing the bottom-most layer to deliver cooling flow which is much colder that would otherwise have been possible, and delaying the point at which an unacceptable temperature is experienced by the downstream portion 36B of the inner surface. This therefore reduces the overall cooling mass flow requirement, whereby less flow is wasted on cooling the nozzle 30 and the engine's propulsive efficiency can be improved.

The enhanced cooling allows lighter materials with lower thermal capabilities to be used in the construction of the nozzle 30, and/or can increase component life.

Figure 5:
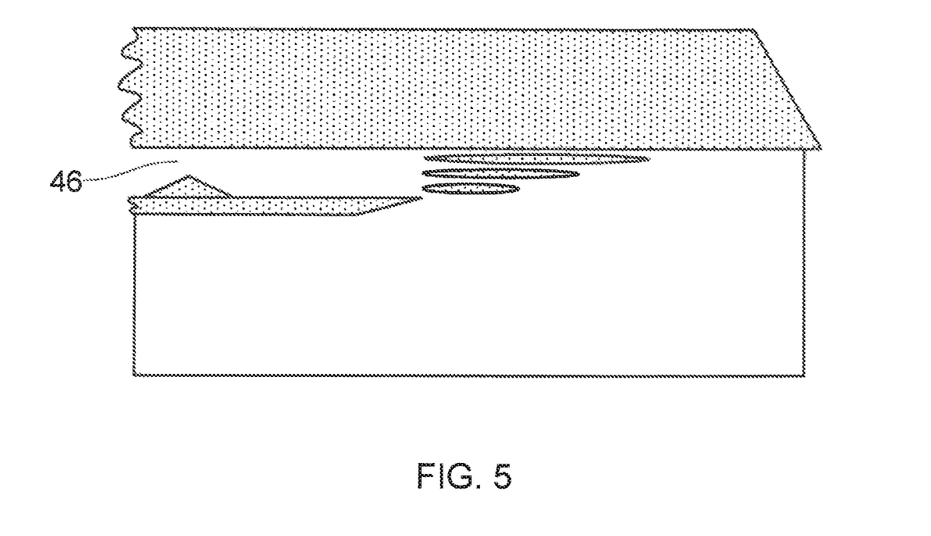
FIG. 5 shows the area of box B in more detail for a variant of the engine of FIG. 2.

As shown in FIG. 5, the cooling channel 38 may contain an aerodynamic throat 46 to choke the flow of cooling air therethrough. This can help to decouple the cooling performance of the channel and the nested cooling passages 42 from the performance of the engine for all throttle settings.

Additionally or alternatively, given that the most stringent cooling requirements typically occur only at certain engine operating conditions (e.g. maximum power take-off in hot conditions, or when infra-red emissions of surfaces must be controlled), cooling flow through the cooling channel 38 can be controllably varied as needed. For example, a flow metering device 48, such as a valve, can be located in the cooling channel, as shown schematically in FIG. 6, to control the mass flow through the channel and hence reduce the amount of air flow being wasted on cooling during less stringent engine operating conditions (e.g. cruise).

Figure 6:
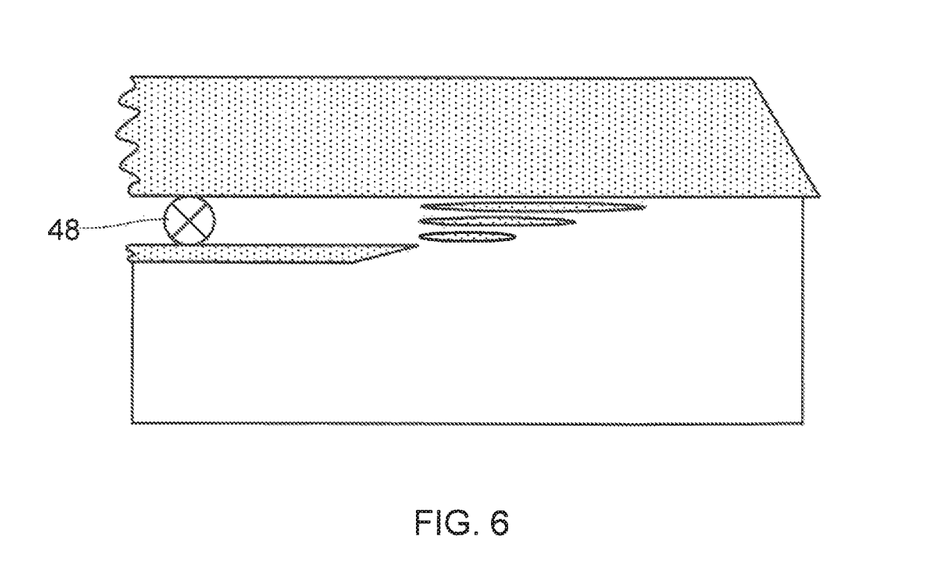
FIG. 6 shows the area of box B in more detail for another variant of the engine of FIG. 2.
Figure 7:
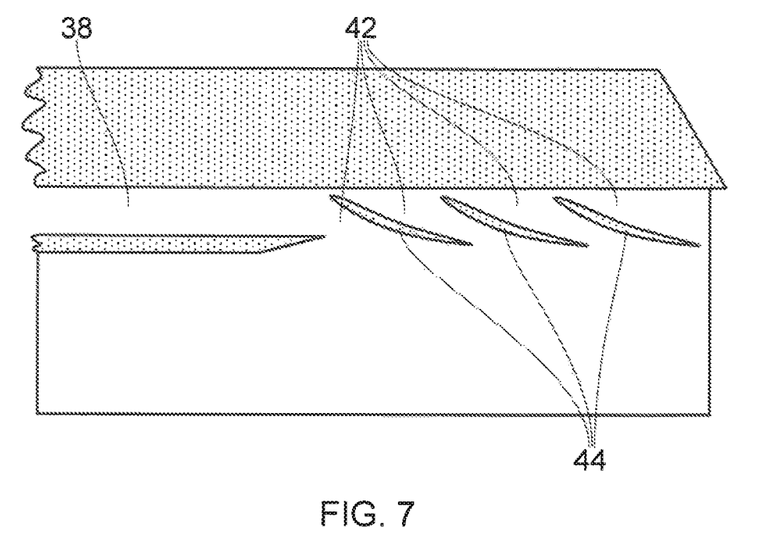
FIG. 7 shows the area of box B in more detail for another variant of the engine of FIG. 2.

Due to the need with the radially nested cooling passages 42 shown in FIGS. 3, 5 and 6 to flow cooling air over the dividing walls 44, the cooling air exit plane defined by the outlets from the passages is angled relative to the engine axis and the direction of flow of the exhaust gas through the nozzle 30. However, as shown in FIG. 7, it is also possible to form the cooling passages so that their outlets lie on a straight line which is parallel with the direction of flow of the exhaust gas through the nozzle. This can be achieved by introducing more axial nesting of the cooling passages, and reducing the amount of radial nesting. Having the outlets lie on such a straight line may be preferred for installation reasons.

In FIGS. 3 and 5 to 7, the cooling channel 38 and the cooling passages 42 are annular and coaxial. However, depending on the cooling requirement of the inner surface of the nozzle 30, the cooling channel and/or the cooling passages may extend only partially around the circumference of the nozzle. In this way, cooling can be provided just at specific angular locations around the nozzle. Indeed, more generally the cooling air flow from the cooling passages can be used to cool adjacent airframe components, such wing or nacelle surfaces, as well as or instead of the inner surface of the nozzle. Non-axisymmetrically arranged cooling passages can be used to direct cooling air specifically to these surfaces.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A gas turbine engine including:
   a main gas flow exhaust nozzle having an annular inner surface which, in use, bounds a flow of exhaust gas; and
   a cooling channel having a downstream end, the downstream end being divided into at least three nested cooling passages, the cooling channel providing a flow of cooling air to the at least three nested cooling passages, the flow of cooling air exiting from the at least three nested cooling passages over a first surface of the gas turbine engine or an adjacent airframe component, thereby protecting the first surface from the flow of exhaust gas;
   the at least three nested cooling passages including 1) a first nested cooling passage having a first inlet that receives a first portion of the cooling air from the cooling channel and a first outlet, the first nested cooling passage formed from a first wall and a first dividing wall, 2) a second nested cooling passage having a second inlet that receives a second portion of the cooling air from the cooling channel and a second outlet, the second nested cooling passage formed from the first dividing wall and a second dividing wall, the first dividing wall separating the first nested cooling passage from the second nested cooling passage, and 3) a third nested cooling passage having a third inlet that receives a third portion of the cooling air from the cooling channel and a third outlet, the third nested cooling passage formed from the second dividing wall and a second wall, the second dividing wall separating the second nested cooling passage from the third nested cooling passage;
   wherein the first outlet, the second outlet and the third outlet are staggered in an axial direction along a longitudinal axis of the main gas flow exhaust nozzle;
   wherein the first dividing wall is radially inward of the second dividing wall in a radial direction of the main gas flow exhaust nozzle and a first length of the first dividing wall is less than a second length of the second dividing wall; and
   wherein the first nested cooling passage, the second nested cooling passage and the third nested cooling passage overlap each other in at least one axial position along the axial direction of the main gas flow exhaust nozzle, the at least one axial position being axially between each of the first inlet and the first outlet of the first nested cooling passage, the second inlet and the second outlet of the second nested cooling passage and the third inlet and the third outlet of the third nested cooling passage.

2. The gas turbine engine according to claim 1, wherein the at least three nested cooling passages are radially nested relative to the longitudinal axis of the main gas flow exhaust nozzle.

3. The gas turbine engine according to claim 1, wherein the outlets from the at least three nested cooling passages are formed adjacent to the annular inner surface of the main gas flow exhaust nozzle.

4. The gas turbine engine according to claim 3, wherein the outlets of the at least three nested cooling passages are formed the annular inner surface upstream of a trailing edge of the main gas flow exhaust nozzle, such that the first surface includes at least a first portion of the annular inner surface.

5. The gas turbine engine according to claim 3, wherein the at least three nested cooling passages are annular and coaxial with each other.

6. The gas turbine engine according to claim 1, wherein the cooling channel, extends radially outwardly of a second portion of the annular inner surface of the main gas flow exhaust nozzle.

7. The gas turbine engine according to claim 6, wherein the cooling channel is annular.

8. The gas turbine engine according to claim 6, wherein the cooling channel contains an aerodynamic throat to choke the flow of cooling air therethrough.

9. The gas turbine engine according to claim 6, wherein the cooling channel has a controllable flow metering device to variably meter the flow of cooling air therethrough.

10. The gas turbine engine according to claim 1, wherein the main gas flow exhaust nozzle has a variable area part.

11. The gas turbine engine according to claim 10, wherein the first surface includes an inner surface of the variable area part.

12. The gas turbine engine according to claim 1, wherein the outlets of the at least three nested cooling passages are each spaced in the axial direction by a distance between 5 and 10 times a passage height of one of the at least three nested cooling passages.

13. The gas turbine engine according to claim 1, wherein each of the at least three nested cooling passages has a height measured in the radial direction between 5 and 30 mm.

14. The gas turbine engine according to claim 1, wherein the inlets of each of the at least three nested cooling passages are axially aligned.

* * * * *